United States Patent [19]

Suganuma et al.

[11] Patent Number: 4,542,378

[45] Date of Patent: Sep. 17, 1985

[54] METHOD OF PROCESSING DOCUMENTS

[75] Inventors: Saburo Suganuma; Hiroyuki Kataoka; Yoshio Arai, all of Kanagawa, Japan

[73] Assignee: Fuji Xerox Co., Ltd., Tokyo, Japan

[21] Appl. No.: 357,128

[22] Filed: Mar. 11, 1982

[30] Foreign Application Priority Data

Mar. 12, 1981 [JP] Japan .................. 56-34632

[51] Int. Cl.⁴ .............................................. G09G 3/00
[52] U.S. Cl. ...................................... 340/734; 382/61; 358/256
[58] Field of Search ...................... 340/734, 723, 724; 382/61; 358/256

[56] References Cited

U.S. PATENT DOCUMENTS

| | | | |
|---|---|---|---|
| 3,037,202 | 5/1962 | McNaney | 340/734 X |
| 3,872,462 | 3/1975 | Lemelson | 340/734 X |
| 4,020,462 | 4/1977 | Morrin, II | 340/734 X |
| 4,214,276 | 7/1980 | Pugsley et al. | 358/256 |
| 4,408,301 | 10/1983 | Iida | 340/724 X |

Primary Examiner—Marshall M. Curtis
Assistant Examiner—Vincent P. Kovalick
Attorney, Agent, or Firm—Sughrue, Mion, Zinn, Macpeak, and Seas

[57] ABSTRACT

A document processing method is disclosed wherein blank forms are read by an image input device, and the format thereof is stored in a memory. Additional information for filling in the form is input in the same manner, and the information is electronically overlaid using a control device for the memory, so that a completed form is stored in the memory for output by a printing device. With the invention, once the blank form is input to the device, further blank forms are unnecessary.

5 Claims, 4 Drawing Figures

METHOD OF PROCESSING DOCUMENTS

BACKGROUND OF THE INVENTION

This invention concerns a method of processing documents and, more specifically, relates to a method of processing documents for use in preparing individual slips such as vouchers or certificates from a list or, conversely, preparing a data collection table such as a list from individual slips.

Conventionally, individual slips such as vouchers have been prepared from a list by the following method. One conventional example of preparing individual slips from a list will be explained by referring to a seal impression certificate issued at an office window of a municipal corporation.

FIG. 1 shows a form 1 for a seal impression certificate, a seal registration book 2 and a seal impression certificate 3 as finally issued.

At first, an overlay form is prepared by cutting out a portion 1a from the form 1. Then, a portion is extracted from the seal registration book 2 and reproduced while being overlaid with the above overlay form, to produce the final certificate 3.

Another method for preparing the certificate, which is the least sophisticated way, is via manual transcription to the seal impression certificate form 1.

However, these methods are defective in that they are time consuming, laborious and result in erroneous transcription.

Further, in a conventional apparatus for issuing and processing individual slips such as vouchers by externally inputting forms, letters or symbols to carry out various types of editing and lay out, input has been made by generating keycodes, thereby reading out previously stored electronic fonts, or by preparing pictures on a screen using a CRT display. However, these methods necessitate various devices requiring the provision of various types of keys for the generation of input codes, and input means such as a light pen. In addition, they are defective in that various types and sizes of fonts have to be prepared and stored for the letters or the symbols, which requires a large memory capacity. Furthermore, the preparation of the forms and the electronic fonts is laborious, and thus uneconomical and inefficient.

On the other hand, in the case where the contents are cut out of individual slips, such as vouchers and certificates, and collected to form a list, a list form is prepared and the contents are transcribed manually or typewritten thereon, or the contents are code-inputted such as by OCR and processed through EDP. These methods are, however, defective due to erroneous transcription in the case of the manual process and erroneous key input in the case of the typewriting process. Furthermore, the electronic transcription of letters onto the vouchers or the lists requires electronic fonts therefor, and the preparation of such electronic fonts in various types and sizes requires a great amount of labor and large memory capacity, which is again uneconomical and inefficient.

SUMMARY OF THE INVENTION

The object of this invention is to overcome the foregoing defects in the prior art and provide a method of processing documents which is simple, and in the process causes fewer errors.

The characteristic features of this invention reside in that, instead of a key input or a light pen input, letters, symbols, various types of forms and patterns written from a platen onto a paper sheet or the like are directly read as images, the thus read images are digitalized, stored and processed to thereby prepare individual slips, such as vouchers, from a list or a book, or to prepare a list from individual slips, with ease and exactness.

DETAILED DESCRIPTION OF THE PREFERRED EMBODIMENTS

Figure 2:
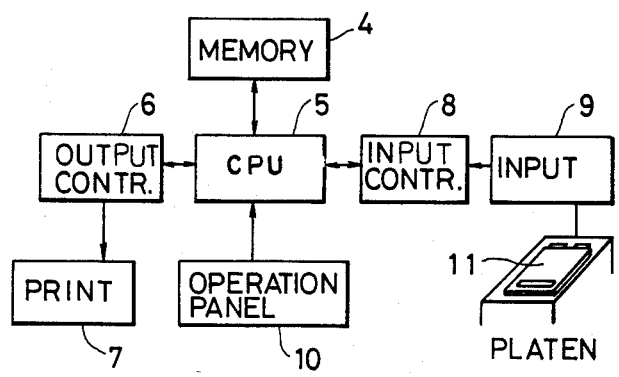
FIGS. 2 and 4 are block diagrams illustrating the document processing devices of the invention.

FIG. 2 illustrates a document processing apparatus for use with a preferred embodiment of this invention, in which the apparatus comprises a memory 4, a control section, for example a CPU 5, and ouput control section 6, a printer 7, an input control section 8, an input section 9 and an operational panel 10. Reference numeral 11 represents a platen which forms a part of the input section 9.

Figure 1:
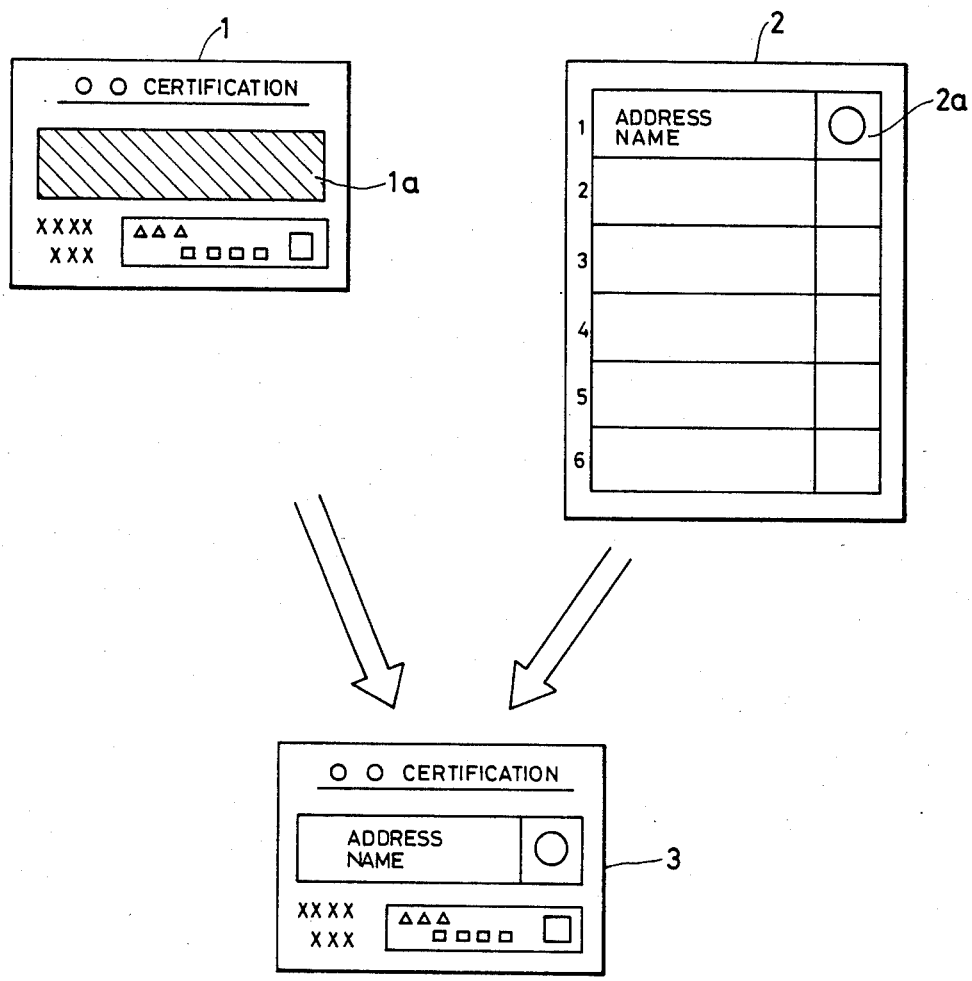
FIGS. 1 and 3 are explanatory views of documents to be processed according to the invention.

This invention will be more specifically explained referring to FIGS. 1 and 2. In the case of preparing the seal impression certificate 3 from the seal registration book 2, the seal impression certificate form 1 is at first placed at a predetermined position on the platen 11 and a start instruction for the form input is issued via the operation panel 10. The platen 11 comprises photoelectronic conversion devices, illumination means, lenses, and other mechanisms, as well as electronic circuits, by which the seal impression certificate form 1 is scanned. The signals thus read are binarily digitized, and thereafter transferred to the memory 4 and stored therein under the control of the control section 5, and filed permanently. The data thus stored for the seal impression certificate form 1 can be read out from the memory 4 for reuse upon every subsequent issue of such a certificate.

Then, a page containing an original voucher for which the issue of the certificate is required is taken from the seal registration book 2 and placed at a predetermined position on the platen 11. Next, the position number of the original voucher (i.e., the number indicated on the left-most side of the seal registration book 2), the number of copies to be issued and the like are designated by the operation panel 10 and, thereafter, an issue start button is depressed. Scanning is carried out in the platen 11 in the same manner as during the input of the seal impression certificate form 1, and the read signals are sent to the memory 4, where they are stored as the data from the seal registration book 2.

Then, the control section 5 reads out the data for the certificate form 1 from among the data in the memory 4, files them in another address, and thereafter reads out the additional required portion, for example the portion 2a, from the data from the seal registration book 2, and transcribes this portion while electronically overlaying it with the previously filed data for the seal impression certificate form 1. As a result, the data for the final seal impression certificate 3 are prepared in the memory 4.

Finally, the data for the seal impression certificate 3, in the memory 4, is transferred via the output control section 6 to the printer 7 and is printed in a digital manner as the seal impression certificate 3. The number of prints and the position of the outputted original voucher can be optionally designated by the operation panel as described above. This form can be used permanently once it has been inputted and stored, for instance, upon installation of the system.

While a method of reading the form and electronically overlaying it is described in the above embodiment, the same effect can be obtained by the use of a pre-printed form. In addition, while the data for the original voucher has been described as being cut-out or selected after it has been inputted into the memory in the above embodiment, the designated portion can be cut-out upon initial reading and selectively inputted. This method can decrease the required memory capacity.

Furthermore, although it is desired that the area cut-out from the original voucher have the same size as the area of the form to which the former is to be transferred, if the areas are different, they may be adequately aligned with each other by an enlarging or reducing operation.

Further, the date of issue may be required, depending on the case, upon the issue of the certificate. In this case, a method may be employed using previously stored numerical fonts which are set by reading out from a ten key pad on the operation panel; or by setting digital switches or the like as an imaged object on a part of the platen, and transcribing the image data thereof in the same manner as the data in the above embodiment.

A second embodiment of the invention will now be explained referring to FIGS. 3 and 4. This embodiment illustrates one example of a method of preparing a list from original slips such as vouchers. In an insurance company, for instance, written subscriptions prepared by subscribers or salesmen (hereinafter referred to as individual slips) are collected into a list or a book.

Those persons in charge have hitherto transcribed the slips manually, or copied the individual slips (vouchers) after carefully arranging and overlaying them.

In this embodiment, replacing the above methods, information from the individual slips is continuously inputted using an automatic document feeder (ADF) from a platen. Then, the information is stored as image data, from which the required portions are cut out and electronically edited into a list or the like, and printed out.

Figure 3:
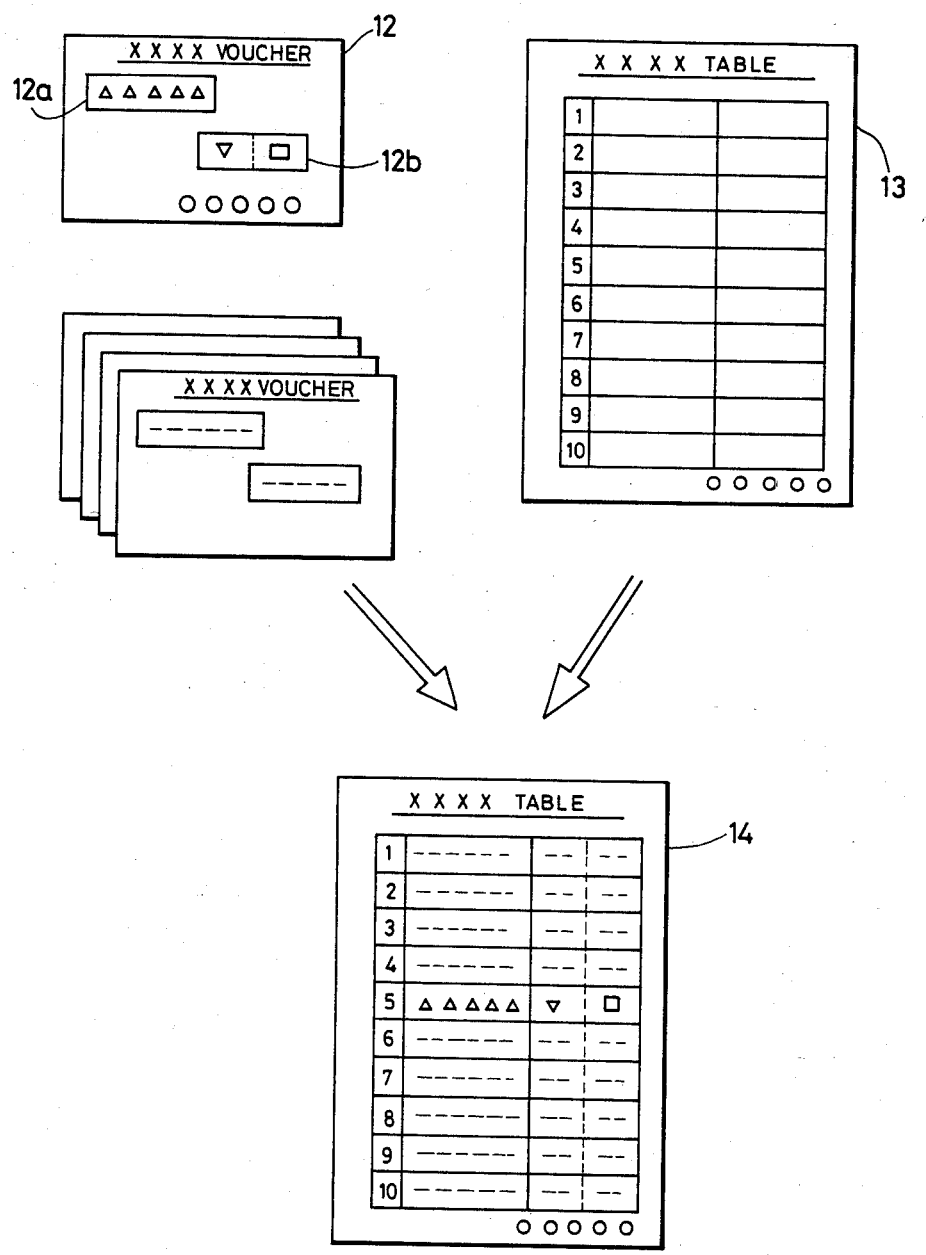

In FIG. 3, reference numeral 12 represents individual slips (written subscriptions), for example, of about A5 or B5 size. Reference numeral 13 represents the form of a list (a so-called subscriber list) of about A4 or B4 paper size. Reference numeral 14 is a list of the same size as the list form 13, which is prepared from the individual slips and the list form 13.

Figure 4:
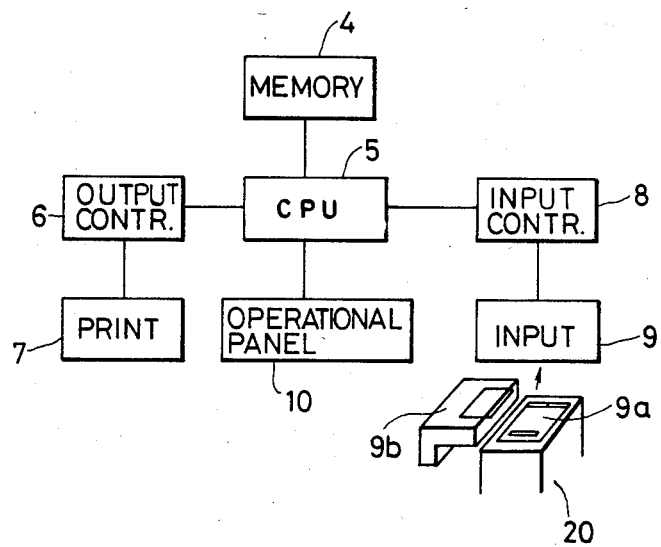

FIG. 4 shows one example of a document processing apparatus for use in this embodiment, which is the same as the apparatus shown in FIG. 2 excepting that an automatic document feeder ADF 9b is mounted on the input section 9. In FIG. 4, the reference numerals represent the identical components as in FIG. 2.

The second embodiment will be explained more specifically referring to FIGS. 3 and 4. Those portions of the image data of the individual slips 12 that are to be cut out (transcribed) are previously designated by way of their coordinates and are recognized by the system. Then, the list form 13 is placed at a predetermined position on the platen 9a and a start instruction for the form input is delivered from the operation panel 10.

The platen 9a comprises photoelectronic conversion devices, lamps, lenses and other mechanisms, as well as electronic circuits, by which the list form 13 is scanned. The signals thus read are digitalized and filed as data for the list form 13 in the memory 4 under the control of the control section 5. It is no longer necessary to input this form again unless it is thereafter altered, and the form can be read out from the memory 4 for reuse upon every preparation of the list.

Next, several individual slips (written subscriptions) are stacked in the order to appear on the list and, thereafter, placed at a predetermined position on the automatic document feeder 9b of the input section 9. Then, after inputting the necessary conditions by means of the operation panel 10, a print start button is depressed. The platen 9b successively scans the individual slips sent from ADF 9b and files the necessary information in the memory 4.

Then, the control section 5, in line with the previously designated conditions, reads the data for the list form from the memory 4 and transfers the same to a working area, and cuts-out the previously stored designated portions of the individual slip data and transcribes them, while overlaying electronically, on the data for the list form. In this way, the data for the list 14 is prepared in the working area.

Finally, the data for the list 14 is transferred to the electronic printer 5 under the control of the output control section 6 and is printed out in a digital manner as a completed list 14.

While a method of reading a form and electronically overlaying the same has been described in this embodiment, a pre-printed list form may be used. Further, although the use of ADF for the input of individual slips has been exemplified herein, manual input directly from the platen may be employed. Further, while it has been explained that the necessary data is cut out from the individual slips, after they have been inputted to the memory, the data may be transferred and electronically overlaid on the list form for every reading of an individual slip. Furthermore, while slip coordinates are aligned along a predetermined position on the platen in the above embodiment, reference marks may be attached to the original slips or the list and the positions thereof may be calculated based on the recognition thereof.

In addition, although the input order of the individual slips corresponds to the order transcribed upon the list in the above embodiment, the input order may be determined by the system by recognizing marks or numerical figures placed on the individual slips. Further, lists classified by the content of the individual slips may be outputted depending upon codes attached to the slips for classifying the contents thereof.

As stated above, according to this invention, since letters, symbols and various forms or patterns written from the platen to a paper sheet or the like are read out directly as images, instead of using key or pen input, and the images thus read are digitalized, stored and processed, the following excellent effects are obtained:

(1) Transcription errors in manual transcription, or input errors in key input can be avoided.
(2) The data can be transcribed at high speed and any number of copies can be obtained. Further, seals or signatures can optionally be relocated.
(3) Provision of letter fonts is no longer necessary, which eliminates the labor and memory cost relevant thereto.

(4) Damage to the forms employed is no longer a concern.

(5) Pre-printed forms are no longer necessary.

What is claimed is:

1. A method of processing documents, comprising the steps of: reading the format information of a first document from an image input means having a platen, storing the thus read format information in a memory section, reading selected information from predetermined positions in other documents by way of the platen, storing the thus read selected information in said memory section, electronically overlaying in the memory section the format information and the selected information from said other documents using a control section, outputting the thus overlaid information through a printer, and providing said first document as a blank form with areas designated for said overlaid information.

2. A method as claimed in claim 1, said format information being permanently stored in the memory section.

3. A method as claimed in claim 1, said electronic overlaying step including reading out from said memory section data corresponding to said format information, and filing said data in another memory address, thereafter reading out data corresponding to said selected information from said other documents, and transcribing the latter data while overlaying it with the former data.

4. A method as claimed in claim 1, wherein said other documents are read and stored, and thereafter said selected information is separated from the data so stored.

5. A method as claimed in claim 1, wherein said other documents are stacked in the order that they will appear on said first document and are serially fed to said image input means by feeder means.

* * * * *